US009961572B2

(12) United States Patent
Foster et al.

(10) Patent No.: US 9,961,572 B2
(45) Date of Patent: May 1, 2018

(54) AUGMENTATION, EXPANSION AND SELF-HEALING OF A GEOGRAPHICALLY DISTRIBUTED MESH NETWORK USING UNMANNED AERIAL VEHICLE (UAV) TECHNOLOGY

(71) Applicant: Delta Energy & Communications, Inc., Murrieta, CA (US)

(72) Inventors: Scott Foster, Murrieta, CA (US); Keith Teichmann, Newton Centre, MA (US)

(73) Assignee: Delta Energy & Communications, Inc., Murrieta, CA (US)

( * ) Notice: Subject to any disclaimer, the term of this patent is extended or adjusted under 35 U.S.C. 154(b) by 0 days. days.

(21) Appl. No.: 15/332,245

(22) Filed: Oct. 24, 2016

(65) Prior Publication Data

US 2017/0134974 A1 May 11, 2017

Related U.S. Application Data

(60) Provisional application No. 62/244,914, filed on Oct. 22, 2015, provisional application No. 62/244,919,
(Continued)

(51) Int. Cl.
*G08B 23/00* (2006.01)
*H04W 24/04* (2009.01)
(Continued)

(52) U.S. Cl.
CPC ............ *H04W 24/04* (2013.01); *G01D 4/006* (2013.01); *H04Q 9/00* (2013.01); *H04Q 2209/25* (2013.01);
(Continued)

(58) Field of Classification Search
CPC .................................................... G01D 4/006
(Continued)

(56) References Cited

U.S. PATENT DOCUMENTS 2,704,809 A * 3/1955 Williams .................. G01S 1/24
327/5
4,724,381 A 2/1988 Crimmins
(Continued)

FOREIGN PATENT DOCUMENTS

CN 101860978 10/2010
CN 102255869 11/2011
(Continued)

OTHER PUBLICATIONS

Amin, R. et al., "Roadmap to Smart Grid Technology: A Review of Smart Information and Communication System," International Journal of Control and Automation, vol. 7, No. 8, 2014, pp. 407-418.
(Continued)

*Primary Examiner* — Santiago Garcia
(74) *Attorney, Agent, or Firm* — Ware, Fressola, Maguire & Barber LLP (57) ABSTRACT

An apparatus is provided including an unmanned aerial vehicle and a transformer monitoring device, particularly for use in a smart grid network system to support a wireless mesh network in the smart grid network and to collect metering data relating to electricity usage in the smart grid network. The transformer monitoring device is configured to receive signaling containing data from one or more network devices in a smart grid network and transmit signaling containing data to the one or more network devices in the smart grid network, and also to receive signaling containing metered usage data from at least one electric meter associated with a building receiving electricity from a transformer in the smart grid network.

15 Claims, 5 Drawing Sheets

US 9,961,572 B2
Page 2

Related U.S. Application Data filed on Oct. 22, 2015, provisional application No. 62/299,348, filed on Feb. 24, 2016.

(51) Int. Cl.
*G01D 4/00* (2006.01)
*H04Q 9/00* (2006.01)
*H04W 84/18* (2009.01)

(52) U.S. Cl.
CPC ..... *H04Q 2209/40* (2013.01); *H04Q 2209/50* (2013.01); *H04Q 2209/60* (2013.01); *H04W 84/18* (2013.01); *Y02B 90/243* (2013.01); *Y02B 90/246* (2013.01); *Y04S 20/325* (2013.01); *Y04S 20/42* (2013.01)

(58) Field of Classification Search
USPC .................................................. 340/870.02
See application file for complete search history.

(56) References Cited

U.S. PATENT DOCUMENTS

| | | |
|---|---|---|
| 5,426,360 A | 6/1995 | Maraio et al. |
| 5,748,104 A | 5/1998 | Argyroudis et al. |
| 5,940,009 A | 8/1999 | Loy et al. |
| 6,018,449 A | 1/2000 | Nelson et al. |
| 6,211,764 B1 | 4/2001 | Schweitzer, Jr. |
| 6,300,881 B1 | 10/2001 | Yee et al. |
| 6,549,120 B1 | 4/2003 | de Buda |
| 6,711,512 B2 | 3/2004 | Noh |
| 6,829,491 B1 | 12/2004 | Yea et al. |
| 6,856,256 B2 | 2/2005 | Winkler |
| 6,880,086 B2 | 4/2005 | Kidder et al. |
| 6,906,630 B2 | 6/2005 | Georges et al. |
| 6,998,962 B2 | 2/2006 | Cope et al. |
| 7,049,976 B2 | 5/2006 | Hunt et al. |
| 7,054,770 B2 | 5/2006 | Swarztrauber et al. |
| 7,058,524 B2 | 6/2006 | Hayes et al. |
| 7,107,329 B1 | 9/2006 | Schroder et al. |
| 7,126,558 B1 | 10/2006 | Dempski |
| 7,271,735 B2 | 9/2007 | Rogai |
| 7,304,587 B2 | 12/2007 | Boaz |
| 7,310,052 B2 | 12/2007 | Bowman |
| 7,402,993 B2 | 7/2008 | Morrison |
| 7,440,436 B2 | 10/2008 | Cheng et al. |
| 7,496,078 B2 | 2/2009 | Rahman |
| 7,733,839 B1 | 6/2010 | Frank et al. |
| 7,747,534 B2 | 6/2010 | Villicana et al. |
| 7,764,943 B2 | 7/2010 | Radtke |
| 7,894,371 B2 | 2/2011 | Bonta et al. |
| 7,936,163 B2 | 5/2011 | Lee, Jr. |
| 7,940,039 B2 | 5/2011 | de Buda |
| 7,961,740 B2 | 6/2011 | Flammer, III et al. |
| 8,054,199 B2 | 11/2011 | Addy |
| 8,060,259 B2 | 11/2011 | Budhraja et al. |
| 8,121,741 B2 | 2/2012 | Taft et al. |
| 8,145,732 B2 | 3/2012 | Kumar et al. |
| 8,194,275 B2 | 6/2012 | Furst et al. |
| 8,279,870 B2 | 10/2012 | Flammer, III et al. |
| 8,305,932 B2 | 11/2012 | Qiu et al. |
| 8,311,863 B1 | 11/2012 | Kemp |
| 8,370,697 B2 | 2/2013 | Veillette |
| 8,385,978 B2 | 2/2013 | Leung et al. |
| 8,401,709 B2 | 3/2013 | Cherian et al. |
| 8,412,735 B2 | 4/2013 | Yeh et al. |
| 8,428,021 B2 | 4/2013 | Karunakaran et al. |
| 8,437,883 B2 | 5/2013 | Powell et al. |
| 8,441,372 B2 | 5/2013 | Smith et al. |
| 8,452,555 B2 | 5/2013 | Swarztrauber et al. |
| 8,509,953 B2 | 8/2013 | Taft |
| 8,543,250 B2 | 9/2013 | Seo et al. |
| 8,553,561 B1 | 10/2013 | Chokshi et al. |
| 8,566,046 B2 | 10/2013 | Deaver, Sr. |
| 8,583,520 B1 | 11/2013 | Forbes, Jr. |
| 8,600,572 B2 | 12/2013 | Sri-Jayantha |
| 8,660,868 B2 | 2/2014 | Vogel et al. |
| 8,792,626 B2 | 7/2014 | Cook et al. |
| 8,847,826 B2 | 9/2014 | Rao et al. |
| 8,855,102 B2 | 10/2014 | Borleske et al. |
| 8,862,281 B2 | 10/2014 | Yoneda et al. |
| 8,874,477 B2 | 10/2014 | Hoffberg |
| 8,880,234 B2 | 11/2014 | Sekoguchi et al. |
| 8,909,358 B2 | 12/2014 | Karnouskos |
| 8,917,716 B2 | 12/2014 | Tran |
| 8,937,497 B1 | 1/2015 | Tobin |
| 8,963,807 B1 | 2/2015 | Lee et al. |
| 8,965,590 B2 | 2/2015 | Boardman et al. |
| 8,970,394 B2 | 3/2015 | Veillette |
| 9,002,670 B2 | 4/2015 | Hurri et al. |
| 9,013,173 B2 | 4/2015 | Veillette |
| 9,014,996 B2 | 4/2015 | Kamel et al. |
| 9,043,174 B2 | 5/2015 | Arya et al. |
| 9,052,216 B2 | 6/2015 | Kamel et al. |
| 9,087,451 B1* | 7/2015 | Jarrell ................. G08G 5/0069 |
| 9,110,101 B2 | 8/2015 | Pietrowicz et al. |
| 9,112,381 B2 | 8/2015 | Carralero et al. |
| 9,118,219 B2 | 8/2015 | Booth |
| 9,129,355 B1* | 9/2015 | Harvey ................. G06T 7/0008 |
| 9,141,653 B2 | 9/2015 | Zhou et al. |
| 9,144,082 B2* | 9/2015 | Rubin |
| 9,162,753 B1 | 10/2015 | Panto et al. |
| 9,400,192 B1* | 7/2016 | Salser, Jr. ............. G01D 4/002 |
| 9,402,292 B1* | 7/2016 | Gordin |
| 9,654,173 B2* | 5/2017 | Barzegar ................. H04B 3/54 |
| 2001/0038342 A1* | 11/2001 | Foote ..................... G01D 4/004 340/870.02 |
| 2002/0046368 A1 | 4/2002 | Friedrich et al. |
| 2002/0064010 A1 | 5/2002 | Nelson et al. |
| 2003/0050737 A1 | 3/2003 | Osann, Jr. |
| 2003/0078996 A1 | 4/2003 | Baldwin |
| 2003/0128149 A1 | 7/2003 | Miceli et al. |
| 2004/0082203 A1 | 4/2004 | Logvinov et al. |
| 2005/0078624 A1 | 4/2005 | Shu et al. |
| 2006/0007016 A1 | 1/2006 | Borkowski et al. |
| 2006/0056363 A1 | 3/2006 | Ratiu et al. |
| 2006/0141940 A1 | 6/2006 | Bloom et al. |
| 2007/0048702 A1 | 3/2007 | Jang et al. |
| 2007/0088630 A1 | 4/2007 | MacLeod et al. |
| 2008/0100436 A1 | 5/2008 | Banting et al. |
| 2008/0109387 A1 | 5/2008 | Deaver et al. |
| 2008/0317047 A1 | 12/2008 | Zeng et al. |
| 2009/0003662 A1 | 1/2009 | Joseph et al. |
| 2009/0088907 A1 | 4/2009 | Lewis et al. |
| 2009/0111456 A1 | 4/2009 | Shaffer et al. |
| 2009/0146839 A1 | 6/2009 | Reddy et al. |
| 2009/0167558 A1 | 7/2009 | Borleske et al. |
| 2009/0187284 A1 | 7/2009 | Kreiss et al. |
| 2009/0267792 A1 | 10/2009 | Crichlow |
| 2010/0074176 A1 | 3/2010 | Flammer, III et al. |
| 2010/0313146 A1 | 12/2010 | Nielsen et al. |
| 2011/0047230 A1 | 2/2011 | McGee |
| 2011/0090833 A1 | 4/2011 | Kneckt et al. |
| 2011/0208367 A1 | 8/2011 | Sackman et al. |
| 2012/0007885 A1 | 1/2012 | Huston |
| 2012/0029897 A1 | 2/2012 | Cherian et al. |
| 2012/0050971 A1 | 3/2012 | Seal et al. |
| 2012/0059609 A1 | 3/2012 | Oh et al. |
| 2012/0078686 A1 | 3/2012 | Bashani |
| 2012/0089268 A1 | 4/2012 | Torre et al. |
| 2012/0092114 A1 | 4/2012 | Matthews |
| 2012/0131324 A1 | 5/2012 | Ansari et al. |
| 2012/0229089 A1 | 9/2012 | Bemmel et al. |
| 2012/0230237 A1 | 9/2012 | Gong et al. |
| 2012/0242698 A1 | 9/2012 | Haddick et al. |
| 2012/0249741 A1 | 10/2012 | Maciocci et al. |
| 2012/0253881 A1 | 10/2012 | Schneider et al. |
| 2012/0265355 A1 | 10/2012 | Bernheim et al. |
| 2012/0277926 A1 | 11/2012 | Nielsen et al. |
| 2012/0303746 A1 | 11/2012 | Yu et al. |
| 2012/0316688 A1 | 12/2012 | Boardman et al. |
| 2012/0316696 A1 | 12/2012 | Boardman et al. |
| 2013/0026986 A1 | 1/2013 | Parthasarathy et al. |
| 2013/0035802 A1 | 2/2013 | Khaitan et al. |

(56) References Cited

U.S. PATENT DOCUMENTS

| | | |
|---|---|---|
| 2013/0069985 A1 | 3/2013 | Wong et al. |
| 2013/0077610 A1 | 3/2013 | Amini et al. |
| 2013/0123998 A1 | 5/2013 | King et al. |
| 2013/0190939 A1 | 7/2013 | Lenox |
| 2013/0218495 A1 | 8/2013 | Boone et al. |
| 2013/0222215 A1 | 8/2013 | Kobayashi |
| 2013/0278437 A1 | 10/2013 | Wyk |
| 2013/0278631 A1 | 10/2013 | Border et al. |
| 2013/0289782 A1 | 10/2013 | Giroti |
| 2013/0297087 A1 | 11/2013 | Koster et al. |
| 2013/0297239 A1 | 11/2013 | Arya et al. |
| 2013/0297868 A1 | 11/2013 | Yin et al. |
| 2013/0304264 A1 | 11/2013 | Shao |
| 2014/0067330 A1 | 3/2014 | Flammer, III |
| 2014/0129160 A1 | 5/2014 | Tran |
| 2014/0167977 A1 | 6/2014 | Bean et al. |
| 2014/0172133 A1 | 6/2014 | Snyder |
| 2014/0183964 A1 | 7/2014 | Walley |
| 2014/0233620 A1 | 8/2014 | Bernheim et al. |
| 2014/0237525 A1 | 8/2014 | Rothschild et al. |
| 2014/0241354 A1 | 8/2014 | Shuman et al. |
| 2014/0244017 A1 | 8/2014 | Freiwirth et al. |
| 2014/0244768 A1 | 8/2014 | Shuman et al. |
| 2014/0244833 A1 | 8/2014 | Sharma et al. |
| 2014/0267400 A1 | 9/2014 | Mabbutt et al. |
| 2014/0270749 A1* | 9/2014 | Miniscalco .......... H04B 10/118 398/5 |
| 2014/0277813 A1 | 9/2014 | Powell et al. |
| 2014/0279694 A1 | 9/2014 | Gauger et al. |
| 2014/0289004 A1 | 9/2014 | Monforte et al. |
| 2014/0297206 A1 | 10/2014 | Silverman |
| 2014/0300210 A1 | 10/2014 | Abi-Ackel et al. |
| 2014/0300344 A1 | 10/2014 | Turner et al. |
| 2014/0306525 A1 | 10/2014 | Greer et al. |
| 2014/0312802 A1 | 10/2014 | Recker et al. |
| 2014/0320306 A1 | 10/2014 | Winter |
| 2014/0334073 A1 | 11/2014 | Thompson et al. |
| 2014/0361907 A1 | 12/2014 | Bernheim et al. |
| 2014/0368189 A1 | 12/2014 | Bernheim et al. |
| 2014/0371941 A1 | 12/2014 | Keller et al. |
| 2014/0372583 A1 | 12/2014 | Tseng |
| 2014/0376405 A1 | 12/2014 | Erickson et al. |
| 2014/0376914 A1 | 12/2014 | Miniscalo |
| 2014/0380488 A1 | 12/2014 | Datta Ray et al. |
| 2015/0002186 A1 | 1/2015 | Taft |
| 2015/0019342 A1 | 1/2015 | Gupta |
| 2015/0019553 A1 | 1/2015 | Shaashua et al. |
| 2015/0058445 A1 | 2/2015 | Choi et al. |
| 2015/0063202 A1 | 3/2015 | Mazzarella et al. |
| 2015/0066772 A1 | 3/2015 | Griffin et al. |
| 2015/0094874 A1 | 4/2015 | Hall et al. |
| 2015/0094968 A1 | 4/2015 | Jia et al. |
| 2015/0112469 A1* | 4/2015 | Da Silva Neto ........ H04W 4/04 700/108 |
| 2015/0121470 A1 | 4/2015 | Rongo et al. |
| 2015/0127601 A1 | 5/2015 | McGill et al. |
| 2015/0142963 A1 | 5/2015 | Choi et al. |
| 2015/0148979 A1 | 5/2015 | Forbes, Jr. |
| 2015/0149396 A1 | 5/2015 | Arya et al. |
| 2015/0155713 A1 | 6/2015 | Forbes, Jr. |
| 2015/0163849 A1* | 6/2015 | Bauer ...................... G01D 4/006 702/62 |
| 2015/0179062 A1 | 6/2015 | Ralston et al. |
| 2015/0200846 A1 | 7/2015 | Hui et al. |
| 2015/0220762 A1 | 8/2015 | Jiang et al. |
| 2015/0256433 A1 | 9/2015 | Sum et al. |
| 2015/0256435 A1 | 9/2015 | Sum et al. |
| 2015/0281996 A1 | 10/2015 | Rubin et al. |
| 2015/0288532 A1 | 10/2015 | Veyseh et al. |
| 2015/0294557 A1 | 10/2015 | Willig et al. |
| 2015/0311951 A1 | 10/2015 | Hariz |
| 2015/0370615 A1 | 12/2015 | Pi-Sunyer |
| 2016/0029384 A1 | 1/2016 | Sidhu et al. |
| 2016/0134932 A1 | 5/2016 | Karp et al. |
| 2016/0214715 A1* | 7/2016 | Meffert ................... B64C 39/024 |
| 2016/0327603 A1 | 11/2016 | Sonderegger et al. |
| 2016/0360361 A1 | 12/2016 | Ross et al. |
| 2017/0003142 A1* | 1/2017 | Allcorn .................. G01D 4/002 |
| 2017/0108236 A1* | 4/2017 | Guan ................... F24F 11/0012 |
| 2017/0134092 A1* | 5/2017 | Foster ................... H04B 10/27 |

FOREIGN PATENT DOCUMENTS

| | | |
|---|---|---|
| CN | 102355682 | 2/2012 |
| CN | 102412530 | 4/2012 |
| CN | 102508989 | 6/2012 |
| CN | 202513670 | 10/2012 |
| CN | 103078673 | 5/2013 |
| CN | 103209385 | 7/2013 |
| CN | 103313437 | 9/2013 |
| CN | 103488988 | 1/2014 |
| CN | 103810753 | 5/2014 |
| CN | 203965904 | 11/2014 |
| CN | 104238730 | 12/2014 |
| CN | 104333733 | 2/2015 |
| CN | 204142366 | 2/2015 |
| CN | 204203734 | 3/2015 |
| CN | 104485746 | 4/2015 |
| CN | 104581087 | 4/2015 |
| CN | 204465736 | 7/2015 |
| CN | 204595654 | 8/2015 |
| EP | 2296069 | 3/2011 |
| EP | 2818878 | 12/2014 |
| EP | 2721772 | 10/2015 |
| WO | 2009059386 | 5/2009 |
| WO | 2010003452 | 1/2010 |
| WO | 2011079358 | 7/2011 |
| WO | 2012047089 | 4/2012 |
| WO | 2012122454 | 9/2012 |
| WO | 2012142586 | 10/2012 |
| WO | 2012154938 | 11/2012 |
| WO | 2012155126 | 11/2012 |
| WO | 2013019595 | 2/2013 |
| WO | 2013028407 | 2/2013 |
| WO | 2013123445 | 8/2013 |
| WO | 2013173230 | 11/2013 |
| WO | 2014056558 | 4/2014 |
| WO | 2014091434 | 6/2014 |
| WO | 2014118622 | 8/2014 |
| WO | 2014123737 | 8/2014 |
| WO | 2014124318 | 8/2014 |
| WO | 2014130568 | 8/2014 |
| WO | 2014169018 | 10/2014 |
| WO | 2014175721 | 10/2014 |
| WO | 2015032164 | 3/2015 |
| WO | 2015046695 | 4/2015 |
| WO | 2015073687 | 5/2015 |
| WO | 2015105658 | 7/2015 |
| WO | 2015123623 | 8/2015 |
| WO | 2015131462 | 9/2015 |
| WO | 2015138447 | 9/2015 |
| WO | 2015161083 | 10/2015 |

OTHER PUBLICATIONS

Elyengui, S. et al., "The Enhancement of Communication Technologies and Networks for Smart Grid Applications," International Journal of Emerging Trends & Technology in Computer Science, vol. 2, issue 6, Nov. 2013, pp. 107-115.

Qin, Z., "A Survey of Networking Issues in Smart Grid," www.cse.wustl.edu/~jain/cse570-13/ftp/smrtgrid/index.html, Dec. 20, 2013 (12 pages).

GridSense, "Maximize Intelligence and Minimize Costs at the Distribution Level," http://www.gridsense.com/solutions-products/transformer-monitoring/distribution-transformer-monitoring/, accessed Oct. 13, 2015, 3 pages.

Balakrishnan et al., "Models for Planning Capacity Expansion in Local Access Telecommunication Networks," Massachusetts Institute of Technology Sloan School Working Paper #3048-89-MS, Aug. 1989, 88 pages.

(56) References Cited

OTHER PUBLICATIONS

Corte-Real et al., "Network flow models for the local access network expansion problem," Computers & Operations Research vol. 34, 2007, pp. 1141-1157.
Bauer, "Bundling, Differentiation, Alliances and Mergers: Convergence Strategies in U.S. Communication Markets," Communications & Strategies, No. 60, Dec. 2005, online at http://mpra.ub.uni-muenchen.de/2515/, pp. 59-93.
Balakrishnan et al., "Models for Planning the Evolution of Local Telecommunication Networks," Massachusetts Institute of Technology Operations Research Center working paper, OR195-89, May 1989, 80 pages.
"Smart meter," http://en.wikipedia,org/wiki/Smart_meter, Nov. 10, 2009, 4 pages.
Smart Grid Northwest, "Qualitrol," http://smartgridnw.org/membership/member-organizations/qualitrol/, accessed Oct. 13, 2015, 3 pages.
Jiang, R. et al., "Energy-theft detection issues for advanced metering infrastructure in smart grid," IEEE, Tsinghua Science and Technology, vol. 19, Issue 2, Apr. 15, 2014 (16 pages).
Blumsack, S. et al., Abstract of "Ready or not, here comes the smart grid!" Energy, vol. 37, Issue 1, Jan. 2012 (pp. 61-68).
McLaughlin, S. et al., "Energy theft in the advanced metering infrastructure," Abstract, Critical Information Infrastructures Security, Sep. 30, 2009 (pp. 176-187).
Güngör, V. et al., "Smart Grid Technologies: Communication Technologies and Standards," IEEE Transactions on Industrial Informatics, vol. 7, No. 4, Nov. 2011, pp. 529-539.
Güngör, V. et al., "A Survey on Communication Networks for Electric System Automation," Feb. 2006, available at: https://smartech.gatech.edu/bitstream/handle/1853/27879/electric_system_automation.pdf.
Zaballos, A. et al., "Heterogeneous Communication Architecture for the Smart Grid," IEEE Network, vol. 25, No. 5, Sep./Oct. 2011, pp. 30-37, available at: http://www.itk.ntnu.no/fag/TTK4545/TTK2/Pensum-filer/SmartGrid.pdf.
Clark, A. et al., "Wireless Networks for the Smart Energy Grid: Application Aware Networks," Proceedings of the International MultiConference of Engineers and Computer Scientists, vol. 2, Mar. 17-19, 2010, available at: http://www.iaeng.org/publication/IMECS2010/IMECS2010_pp1243-1248.pdf.
Parikh, P. et al., "Opportunities and Challenges of Wireless Communication Technologies for Smart Grid Applications," 2010, available at: http://citeseerx.ist.psu.edu/viewdoc/download?doi=10.1.1.453.7100&rep=rep1&type=pdf.
Devidas, A. R. and Ramesh, M. V., "Wireless Smart Grid Design for Monitoring and Optimizing Electric Transmission in India," 2010 Fourth International Conference on Sensor Technologies and Applications, Jul. 18-25, 2010, Venice, IEEE, pp. 637-640 (2 pages).
Erol-Kantarci, M. and Mouftah, H. T., "Wireless Multimedia Sensor and Actor Networks for the Next Generation Power Grid," Ad Hoc Networks, vol. 9, Issue 4, Jun. 2011, pp. 542-551 (2 pages).
Gungor, V. C., Lu, B. and Hancke, G. P., "Opportunities and Challenges of Wireless Sensor Networks in Smart Grid," IEEE Transactions on Industrial Electronics, vol. 57, No. 10, Oct. 2010, pp. 3557-3564.
Nasipuri, A. et al., "Demo Abstract: Wireless Sensor Network for Substation Monitoring: Design and Deployment," ResearchGate Conference Paper, Jan. 2008 (3 pages).
International Search Report dated Jan. 19, 2017 in international patent application No. PCT/US2016/058407 (3 pages).
International Search Report and Written Opinion dated Oct. 28, 2016 issued in international patent application No. PCT/US2016/045233 (10 pages).
International Search Report and Written Opinion dated Dec. 9, 2016 in international patent application No. PCT/US2016/046509 (13 pages).
International Search Report and Written Opinion dated Dec. 19, 2016 in international patent application No. PCT/US16/50393 (11 pages).
International Search Report and Written Opinion dated Jan. 23, 2017 in international patent application No. PCT/US2016/049245 (16 pages).
International Search Report and Written Opinion dated May 26, 2017 in counterpart international patent application No. PCT/US2017/019434 (10 pages).
International Search Report and Written Opinion dated Jan. 25, 2017 in international patent application No. PCT/US2016/058383 (13 pages).
St. John, Jeff, "How Utilities Could Use Virtual Reality and Google Glass to Monitor the Grid," Mar. 3, 2015, 6 pages.
InfoBright, "Internet of Things Part 8: Smart Grids—the Future of Energy Delivery," 2014, 2 pages, https://www.infobright.com/index.php/internet-of-things-part-8-smart-grids-future-energy-delivery/#.VdHztvlVhBd.
Monnier, Olivier, "A Smarter Grid With the Internet of Things," Texas Instruments, Oct. 2013, 11 pages.
Lockheed Martin, "Self-Powered Ad-hoc Network", http://www.lockheedmartin.com/us/products/span.html, accessed Nov. 9, 2015.
Owada, et al., "Design for Disaster-Tolerant and Dependable Network Architecture," ICMU 2012, pp. 136-141, Information Processing Society of Japan, 2012.
Morganthaler, et al., "UAVNet: A Mobile Wireless Mesh Network Using Unmanned Aerial Vehicles," available at http://rvs.unibe.ch/research/pub_files/MBZSA12.pdf, 2012.
Snow, "Why Drones Are the Future of the Internet of Things", Dec. 1, 2014, available at https://www.suasnews.com/2014/12/why-drones-are-the-future-of-the-internet-of-things/.
International Search Report and Written Opinion, International Application No. PCT/US2017/46991, dated Nov. 21, 2017 (8 pages).
Detlef Zuehlke, "SmartFactory—Towards a factory-of-things." Annual Reviews in Control, 34.1, Mar. 28, 2010, pp. 129-138.
Artem Katasonov, et al., "Smart Semantic Middleware for the Internet of Things", Jan. 2008, 11 pages.
Andrea Zanella, et al., "Internet of Things for Smart Cities." IEEE Internet of Things Journal, vol. 1, Iss. 1, Feb. 2014, pp. 22-32.
Dieter Uckelmann, et al., "An Architectural Approach Towards the Future Internet of Things." Architecting the Internet of Things, Springer-Verlag Berlin Heidelberg, 2011, pp. 1-24.
Ning Zhong, et al., "Research challenges and perspectives on Wisdom Web of Things (W2T)." The Journal of Supercomputing, Nov. 26, 2010, 21 pages.

* cited by examiner

AUGMENTATION, EXPANSION AND SELF-HEALING OF A GEOGRAPHICALLY DISTRIBUTED MESH NETWORK USING UNMANNED AERIAL VEHICLE (UAV) TECHNOLOGY

CROSS REFERENCE TO RELATED APPLICATION

This application claims benefit to U.S. provisional application No. 62/244,914, filed 22 Oct. 2015, U.S. Provisional Application No. 62/244,919 filed 22 Oct. 2015, and U.S. Provisional Application No. 62/299,348 filed 24 Feb. 2016, which are hereby incorporated by reference in their entirety.

The present invention forms part of, and builds on, the family of technologies disclosed in the other related applications identified below.

BACKGROUND OF THE INVENTION

1. Field of the Invention

The present invention relates to an apparatus comprising an unmanned aerial vehicle and a transformer monitoring device, particularly for use in a smart grid network system to support a wireless mesh network in the smart grid network and to collect metering data relating to electricity usage in the smart grid network.

2. Brief Description of Related Art

Proliferation of the "Internet of Things" (IoT) is driving interconnected smart systems. In particular, smart grids are following this trend though the establishment of smart energy, gas and water management. Interconnected components are now providing an unprecedented level of intelligence supporting numerous operational actions. This landscape is ushering in vast amounts of unstructured data and the need for intelligent data parsing, analysis and action systems.

With this IoT understanding and backdrop, currently there is a need within global smart grid networks, e.g., in urban and remote locations with limited electric infrastructure, for communications with transformers, residential and commercial meters and other Internet/wireless connected IoT devices. These targeted locations do not have sufficient infrastructure to fully deploy a smart grid or Internet infrastructure.

SUMMARY OF THE INVENTION

The smart grid network of the present invention provides the inclusion of wireless communications and data transmission capability into transformer monitoring modules, transformer monitoring being a core component of the smart grid network. These transformer modules may include the capability to both collect and transmit information from the transformer, residential and commercial meters and other Internet/wireless connected devices. These devices differ from other existing technologies by incorporating a transceiver, transmitter and antenna collectively within the same device to both collect data from other network devices deployed in the field and communicate data back to a central location or other connected devices.

In accordance with the present invention, low-cost, consumer available, unmanned aerial vehicle (UAV) technology allows for the immediate and infinitely configurable augmentation of geographically dispersed smart grid network hardware when coupled with a transformer monitoring device. UAV technology is inclusive of fixed wing, rotor-craft, lighter than air, magnetic levitation and other categories and may incorporate propellers, rotating elements, jets, lighter than air gases, physically induced mechanisms, and other means for both dynamic and static flight.

In general, mesh networking is a network topology in which a device transmits its own data as well as serves as a relay for other devices' data. The mesh network connects the transformer monitor devices, smart meters and other sensors or IoT devices wirelessly to each other and to a central point in the mesh cell called a "collector" to transmit data to the cloud using the 802.11s standard. The devices in the mesh network may also comprise optical-based communications technology, for transmitting and receiving optical signals containing data and information.

The collector is a circuitry-board based technology that passes data between multiple smart meters, transformer monitoring devices and a server-based collection engine. The collector functions as a router, exchanging messages between a software collection engine and meters using a radio-frequency local area network. Communications between the collector and the collection engine is done using a Wide Area Network (WAN) that can include a variety of back-haul technologies. All network communications meet ANSI C12 Meter Communication and Data standards and requirements. The transformer monitoring device may comprise the collector.

The mesh network is dynamic and is continuously being rebuilt using wireless communication between smart meters, transformer monitoring devices and collectors. Connectivity between a meter or transformer monitoring devices, and a collector can be direct, through another smart device or through multiple layers of smart devices. Smart devices will automatically register through the collector that provides the best connectivity signal and path to the collection engine. A smart device must register before communications with the collection engine can begin. Each collector can support multiple devices over a self-healing mesh network. If the path between a device and a collector is broken or blocked, the device will locate another path, healing the mesh network, through the network mesh to the collector.

The segregation of near or overlapping mesh networks is secured through the use of a utility identification (ID). Only devices with the same utility ID can communicate across a mesh network. This ensures that a device with one utility ID is isolated from a network assigned a different utility ID. The use of the utility ID protocol allows neighboring utilities to use the smart grid network system, yet be securely isolated from the other utility's network.

The collector used by each device to communicate with the collection engine can change over time. For example, if the communication path between a collector and device deteriorates, the device will explore other paths to the same or different collector. If a better communication path is found, the device will deregister from the original collector and register with the collector that provides the best communication path. Connectivity testing, registering and deregistering are built-in capabilities and are done automatically.

The data from a device may pass through other devices in the mesh network before it reaches the cell relay. The 802.11s mesh network is built using the 5 GHz radio signal frequency band. However, the mesh network is not limited to the 5 GHz radio signal frequency band.

Incorporation of the mesh network enabled by a transformer monitoring device within or affixed to deployed UAV technology allows for infinite and immediate variability in the resulting smart grid network. The present invention allows for the deployment of UAV-affixed transformer monitoring devices to create either a static or immediately re-configurable augmented network. The network is an extension to current smart grid network infrastructure or an augmentation to allow for mesh network servicing, relocation, optimization, security enhancement, and urban resilience testing or disaster relief activities.

Security of the UAV augmented smart grid network shall be inclusive of the security protocols established for the transformer monitoring device deployed mesh network. Transformer monitoring device-enabled UAVs can be individually registered and recognized using GPS and assisted-GPS algorithms. The UAV augmented transformer monitoring device network is capable of registering all mesh communications assets and deregistering assets (UAV or non-UAV) as appropriate and based upon overall mesh communications optimization. Should a UAV-transformer monitoring device fail, the remaining transformer monitoring devices affixed to transformers or UAVs will deregister the failed UAV and optimize communications across the remaining assets, in real-time and autonomously.

Similar to the augmentation noted above, incorporation of the transformer monitoring device enabled mesh network within deployed UAV technology provides an economical alternative to fixed infrastructure with regards to mesh network extension. This capability allows for immediate mesh network deployment, routing investigation, review and, ultimately, optimized fixed deployment.

Deployed transformer monitoring devices affixed to UAVs may be either centrally controlled via human operators and/or software, or stored with programming in a device memory and autonomous in their operation, including locations pre-programmed with specific algorithms known in the art regarding unmanned flight operation. In either case, the UAV returns to a central location of deployment at the end of their prescribed mission. While in field, the UAV-affixed transformer monitoring device facilitates the smart grid mesh communications activity.

Providing a unique capability for urban resilience and disaster relief, incorporation of the transformer monitoring device-enabled mesh network within deployed UAV technology allows for an immediate self-healing capability to non-optimal or damaged mesh networks. This capability allows for the immediate disbursement of multiple UAV-affixed transformer monitoring devices to specific mesh nodes to affect mesh communications optimization or healing, in the case of catastrophic natural or man-made events. As possible, UAVs would remain active during network field operations, ensuring the ongoing capability of the deployed smart grid mesh network.

The present invention enhances utility partner's enterprise operations through the synergistic implementation of the smart grid network a balance sheet refinancing model while deploying a unique, alternative network for BtB/BtC data receipt and delivery. This particular application expands upon these developments through the introduction of the augmented mesh network hardware and software enabled by a UAV-affixed transformer monitoring device.

In accordance with a first aspect of the invention, an apparatus is provided comprising an unmanned aerial vehicle and a transformer monitoring device. The transformer monitoring device comprises a signal processor configured to receive signaling containing data from one or more network devices in a smart grid network, transmit signaling containing data to one or more network devices in the smart grid network, and receive further signaling containing metered usage data from at least one electric meter associated with a building receiving electricity from a transformer in the smart grid network.

In accordance with an embodiment of the apparatus of the first aspect of the invention, the transformer monitoring device is configured to enable a mesh network in the smart grid network to exchange data and content between network devices. In accordance further with the first aspect of the invention, the smart grid network may further comprise a cloud-based server. The transformer monitor device may be configured to serve as a relay for data transmitted between the cloud-based server and one or more network devices, or between two or more network devices.

In accordance with any one or more of the above-described embodiments of the apparatus of the first aspect of the invention, in a further embodiment of the apparatus, the one or more network devices in the smart grid network comprise a second apparatus comprising a second unmanned aerial vehicle and a second transformer monitoring device. The transformer monitor device may be configured to serve as a relay for data transmitted to or from the second apparatus in the smart grid network.

In accordance with any one or more of the above-described embodiments of the apparatus of the first aspect of the invention, in a further embodiment of the apparatus, the one or more network devices in the smart grid network comprise a second transformer monitoring device in the smart grid network mounted to a utility pole. The transformer monitor device may be configured to serve as a relay for data transmitted to or from the second transformer monitoring device.

In accordance with any one or more of the above-described embodiments of the apparatus of the first aspect of the invention, in a further embodiment of the apparatus, the one or more network devices comprise one or more of a mobile communications device, a personal computer or a digital set-top box, and wherein transformer monitoring device is configured to receive signaling containing a request for digital content from the one or more network devices, transmit signaling containing the request for digital content to the cloud-based server, receive signaling containing the requested digital content from the cloud-based server, and transmit signaling containing the requested digital content to the one or more network devices.

In accordance with any one or more of the above-described embodiments of the apparatus of the first aspect of the invention, in a further embodiment of the apparatus, the unmanned aerial vehicle comprises a signal processor and a memory, and the memory is stored with data relating to geographic locations of the one or more network devices in the smart grid network. The signal processor of the unmanned aerial vehicle and/or the signal processor of the transformer monitoring device may be configured to determine geographic positioning of the apparatus. The signal processor of the unmanned aerial vehicle may be configured to receive signaling from a user device instructing the apparatus to deploy to a stored geographic location of a network device in the smart grid network, particularly when the network device is disabled or malfunctioning. The apparatus may be configured to repair the mesh network of the smart grid network by replacing the network device at the stored geographic location that is disabled or malfunctioning and serving as a communications relay in the mesh network in place of the network device at the stored geographic location.

In accordance with any one or more of the above-described embodiments of the apparatus of the first aspect of the invention, in a further embodiment of the apparatus, the unmanned aerial vehicle comprises a signal processor and a memory. The signal processor may be configured to receive signaling from a user device comprising instructions for manually operating flight of the unmanned aerial vehicle to a location in the smart grid network by the user device.

In accordance with any one or more of the above-described embodiments of the apparatus of the first aspect of the invention, in a further embodiment of the apparatus, the signal processor of the transformer monitoring device may be configured to receive further signaling containing metered usage data from a plurality of electric meters, each associated with a building receiving electricity from the transformer in the smart grid network. The signal processor of the transformer monitoring device may be configured to transmit signaling containing data relating to the metered usage data from the plurality of electric meters to the cloud-based server.

In accordance with any one or more of the above-described embodiments of the apparatus of the first aspect of the invention, in a further embodiment of the apparatus, the received and transmitted signaling containing data and the signaling containing metered usage data are optical signals.

In accordance with any one or more of the above-described embodiments of the apparatus of the first aspect of the invention, in a further embodiment of the apparatus, the transformer monitoring device signal processor is further configured to receive further signaling containing data from a smart infrastructure device in the smart grid network, including one or more of a street light, road sign, traffic light or asset tracking module.

It is further noted that in alternative embodiments of the apparatus of the first aspect of the invention, the transformer monitoring device may not be configured for receiving signaling containing metered usage data from an electric meter in the smart grid network. In such embodiments, the transformer monitoring apparatus may be configured to send and receive signaling containing data to and from one or more network devices in the smart grid network, or one or more smart infrastructure devices in the smart grid network, including, for example, one or more of a street light, road sign, traffic light or asset tracking module.

In accordance with a second aspect of the invention, a smart grid network is provided. The smart grid network comprises a first transformer monitoring device affixed to a utility pole or transformer at a first location, one or more network devices, including at least one electric meter associated with a building receiving electricity from a transformer in the smart grid network; and a first apparatus. The first apparatus comprises an unmanned aerial vehicle and a second transformer monitoring device. The second transformer monitoring device comprises a signal processor configured to receive signaling containing data from the one or more network devices in the smart grid network, transmit signaling containing data to the one or more network devices in the smart grid network, and receive further signaling containing metered usage data from the at least one electric meter associated with the building receiving electricity from the transformer in the smart grid network.

In accordance with a further embodiment of the smart grid network of the second aspect of the invention, a further embodiment of the smart grid network may further comprise a mesh network enabled by the second transformer monitoring device and configured to exchange data and content between the one or more network devices.

In accordance with any one or more of the above-described embodiments of the smart grid network of the second aspect of the invention, a further embodiment of the smart grid network may comprise a cloud-based server. The second transformer monitoring device may be configured to serve as a relay for data transmitted between the cloud-based server and one or more network devices, or between two or more network devices.

In accordance with any one or more of the above-described embodiments of the smart grid network of the second aspect of the invention, in a further embodiment of the smart grid network, the second transformer monitor device may be configured to serve as a relay for data transmitted to or from the first transformer monitoring device.

In accordance with any one or more of the above-described embodiments of the smart grid network of the second aspect of the invention, a further embodiment of the smart grid network may comprise a second apparatus comprising a second unmanned aerial vehicle and a third transformer monitoring device. The second transformer monitor device is configured to serve as a relay for data transmitted to or from the second apparatus in the smart grid network.

In accordance with any one or more of the above-described embodiments of the smart grid network of the second aspect of the invention, in a further embodiment of the smart grid network, the first apparatus is positioned at a second location different from the first location, and is configured to extend a geographic range of the mesh network.

In accordance with any one or more of the above-described embodiments of the smart grid network of the second aspect of the invention, in a further embodiment of the smart grid network, the first apparatus is configured to be deployed to the first location when the first transformer monitoring device becomes non-operational, to enable the mesh network of the smart grid network.

DETAILED DESCRIPTION OF THE INVENTION

The overall smart power grid network according to the present invention represents an interconnected so-called "BIG DATA" technology system providing advanced intelligence and synergistic components across power metering, distribution and communication, optimization and installation and servicing. The network incorporates discrete elements in the transformer monitoring and communications, residential and commercial metering and analytical, predictive and pre-emptive software algorithms. The hardware associated with the network facilitates communications with transformers, residential and commercial meters, and other Internet/wireless connected devices. The network's geographically disbursed assets support a wireless mesh network communications extension, while aiding system optimization capabilities, noting that many assets are in logistically difficult areas to reference, re-locate, interrogate and service. The overall integrated system drives substantial efficiencies in data visualization, evaluation, diagnosis, optimization, and servicing using enhanced reality systems across this interconnected smart grid network and similar networks. The collective systems provide a synergistic and unique alternative network for BtB/BtC data receipt and delivery.

Figure 1:
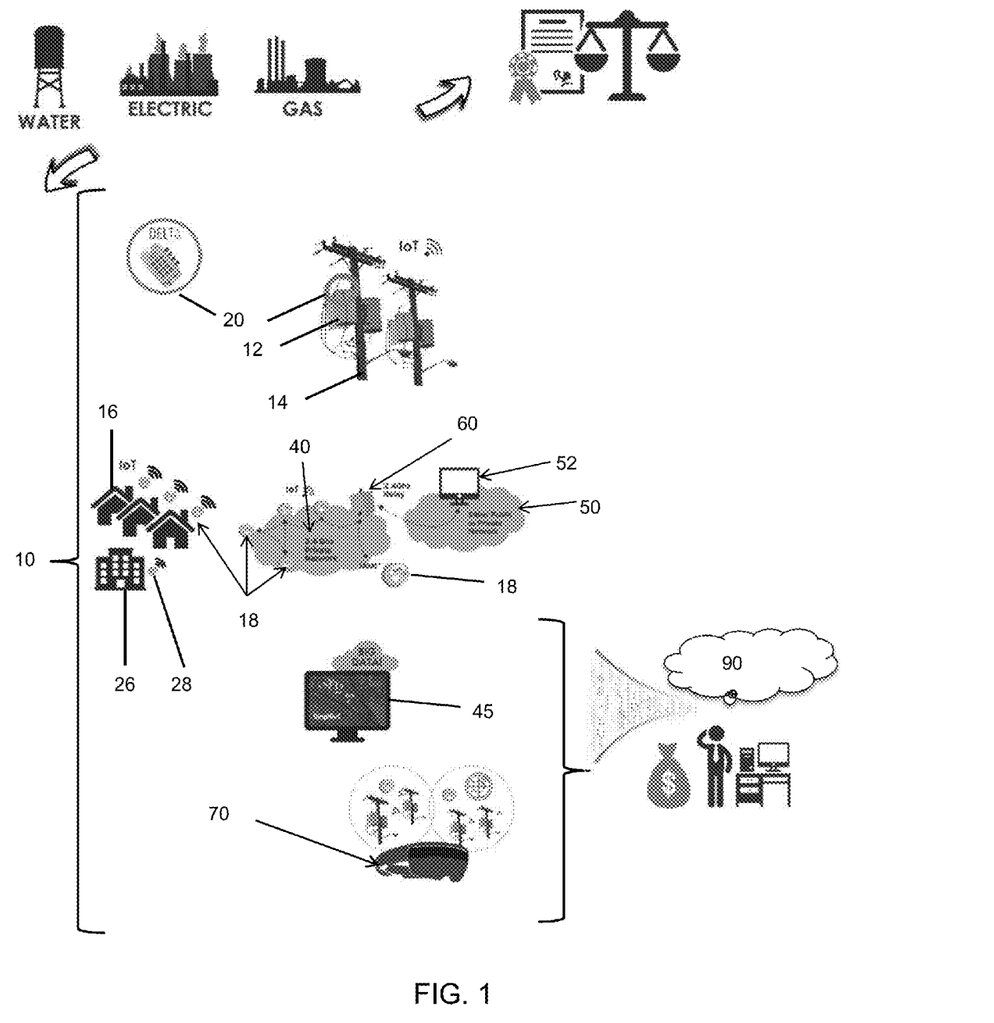
FIG. 1 is a diagram showing an establishment of a baseline, power grid centric, smart utility mesh network, according to some embodiments of the present invention.

An example of an implementation of a smart grid network 10 is shown in FIG. 1. The smart grid network 10 according to the present invention represents a singular, standardized, and scalable network, providing the industry's first inclusive solution from a singular supplier. The smart grid network 10 may incorporate a utility financials rebalancing, and incorporate utility customers and IoT adjacencies. The smart grid network 10 is inclusive of four basic technology elements. The primary hardware and software constituents of the network are as noted and identified below.

1. The pole or pad mounted transformer monitor/smart data collector device is identified herein as element 20, according to the present invention (AKA "HyperSprout™"), which is the localized data aggregation and power flow investigation; establishing a data capture and delivery capability wherever there is power, e.g., consistent with that set forth herein.

2. A digital data and delivery and receipt mesh network (AKA "DataVINE™") is identified herein as element 40, which is a ubiquitous mesh network facilitating automated residential and commercial metering while deploying an alternative data delivery capability; enforcing a market-leading 100% meter read capability, e.g., consistent with that set forth in U.S. application Ser. No. 15/250,119.

3. A smart node power grid communication protocol (AKA "DataSCAPE™"), identified herein as element 45, which provides for a comprehensive nodal exchange analysis of all grid parameters; realizing an inclusive geo-spatial understanding of utility operations, e.g., consistent with that set forth in U.S. provisional application Ser. No. 62/375,170.

4. A head-mounted user device 70 for enhanced reality field investigation, interaction and servicing; deploying the industry's first "virtual" utility (AKA "PowerVISR™"), e.g., consistent with that set forth in U.S. patent application Ser. No. 15/234,293.

The smart grid network 10 and the mesh network 40 enabled by the transformer monitor device 20 and other network devices provide network access to an end user. Additionally, the end user may use the established network for the purpose of storing and retrieving data and files from a cloud-based server 90.

By way of example, FIG. 1 shows an example of a smart power grid network generally indicated as 10, according to some embodiments of the present invention. The smart power grid network 10 may take the form of, or may be configured to include, one or more digital data and delivery and receipt mesh networks like element 40. Each digital data and delivery and receipt mesh network 40 may include one or more communication nodes such as the transformer module or device 20 for exchanging information upstream and downstream between the communication nodes and a central location, e.g., which takes the form of the private network 50 in FIG. 1. The one or more communication nodes may be configured to be able exchange such upstream and downstream information between themselves in order to exchange such upstream and downstream information between a respective communication node and the central location like element 50.

In FIG. 1, the smart power grid network 10 may include transformers like element 12 for providing electric energy to residential homes and commercial buildings like elements 16, 26, each having a respective electrical meter like elements 18, 28 for measuring the associated electrical energy usage. The smart power grid network 10 may also include transformer monitor/data collection devices 20 configured to collect data about the electrical energy usage in relation to residential homes and commercial buildings 16, 26 from the respective electrical meter like element 18, 28. For example, each electrical meter 18, 28 may provide metered data signaling containing information about metered data related to associated electrical signaling being supplied from the transformer 12 to the building or structure 16, 26 in the grid network 10. Moreover, transformer monitor/data collection devices 20 may receive associated signaling containing information about electrical signaling data related to electricity being processed by the transformer 12 located and arranged in the grid network and to which the transformer monitoring device is mounted, as well as other wireless network data related to other communication nodes forming part of other wireless network devices deployed in the grid network. In effect, the collected data received by the transformer monitor device 20 may include some combination of the electrical signaling data related to the transformer, the metered data related to the electrical meter and/or the other wireless network data related to other communication nodes in the grid network, e.g., which may include digital content as set forth in further detail below.

The transformer monitor/data collection devices 20 may also configured to provide suitable signaling containing information about the collected data to the private network 50 via the digital data and delivery and receipt mesh network 40. The private network 50 may be configured as a central point that processes the collected data, e.g., performing utility analysis that may include one or more of the following: delivery subtraction analysis, proactive asset monitoring, distribution asset utilization, T and D subtraction analysis, energy audits and analysis, load control, geographic localization and define pro-active and pre-emptive asset efficiency or operational activities. By way of example, the utility analysis may be performed in an effort to increase efficiency, decrease costs, increase profits and/or community engagement related to the operation of the smart grid network 10.

The pole 14 mounted transformer monitoring device 20 may be configured in communication with the electrical meter 18 associated with the residential home 16. By way of example, the electrical meter 18 may be configured to measure single phase electrical energy provided by the transformer 12 along a single phase utility line 11 to the residential home 16.

In comparison, the pole 14 mounted transformer monitoring device 20 may also include, or take the form of, a pad mounted transformer device in communications with an electrical meter associated with a commercial building home. By way of example, the electrical meter may be configured to measure three phase electrical energy provided by a pad transformer along a three phase utility line to the commercial building home.

FIG. 1 shows that the transformer monitoring device 20 may be configured to collect data related to some distribution related functionality, e.g., including determinations related to outage, momentary outage, voltage/VAR, and/or transformer monitoring. FIG. 1 shows that the transformer monitor device 20 may be configured to collect data related to some voltage analysis, DRM functionality and energy theft functionality in relation to its associated residential home or commercial building. The transformer monitor device 20 can provide the suitable signaling containing information about the collected data to the private network 50 via the digital data and delivery and receipt mesh network 40. The collected data received by the private network 50 may also be analyzed in relation to conservation, load curtailment and/or a demand response vis-a-vis the power utility. In FIG. 1, the private network 50 may include a private network computer and monitor generally indicated as 52 for performing or implementing the aforementioned analysis and functionality.

FIG. 1 shows that the digital data and delivery and receipt mesh network 40 may include other transformer monitor devices like element 20 exchanging information with other meters like elements 18, 28 associated with other buildings or structures like elements 16, 26. FIG. 1 also shows a relay 60 coupled between the digital data and delivery and receipt mesh network 40 and the private network 50.

The present invention represents a new and unique inclusion of wireless communications and data transmission capability into transformer monitoring modules like element 20, transformer monitoring being a core component within a so-called smart grid network like element 10. These transformer modules 20 may be mounted directly to utility transformers 12 or utility poles 14 in the field and include the capability to both collect and transmit information from the transformer 12, residential and commercial meters like element 18 and other Internet/wireless connected devices in the network 10. The transformer module or device 20 according to the present invention differs from other existing technology by incorporating a transceiver, transmitter and antenna collectively within the same device to both collect data from other network devices, including other transformer modules 20 or smart assets, deployed in the field and communicate collected data back to a central location like element 50 or other connected devices like other elements 20.

The aforementioned overall combination provides an infinitely scalable data delivery and receipt capability for communities with poorly established, historical infrastructure while providing a synergistic network capability to those communities with current or anticipated cellular, satellite, optical or other capability.

Once established, the smart grid network implementation and the associated transformer module and mesh network hardware and software assets may be easily expanded to allow for integration with both smart city infrastructure 16, 26 and home automation smart devices. For example, inclusion of a smart grid network communications chip set for implementing smart grid network communications chip set signal processing functionality into locally deployed smart assets allows for both the capture and communications of digital information both to and from these smart asset devices. By way of example, these smart asset devices may include, or take the form of, set top boxes having the smart grid network communications chip set contained therein, e.g., for communicating with a transformer module like element 20, or for communication with the so-called cloud 90. In areas of established infrastructure, this capability allows for the localized capture and communications with smart devices within the geographical confines of the mesh network smart network like element 10. In areas where coordination is required outside of this localized network, a backend cellular capability may be utilized, like the backend cellular functionality associated with a back end cellular tower. In peri-urban and rural areas of extremely poor infrastructure and cellular service, the smart grid network deployed system provides a competitive and less costly alternative to dedicated cellular infrastructure and may be paired with various wireless transmissions medias including cellular, satellite, optical or other wireless transmissions media either now known or later developed in the future.

The mesh network 40 described herein is an open network, such that those within the geographic region of operation will opt-in if desired, through the utility company administering the network. The network is not closed to any individuals opting in. The network is configured to support a throughput of up to 600 Mbps in a 802.11s wireless network.

By way of further example, the integration with, or replacement of, local wireless network delivery systems allows the seamless integration with current home automation technology, allowing for the direct communication with these devices using the smart grid network deployed system.

Scaling of the deployed transformer modules or devices 20 with ongoing optimization of the defined mesh network 40 allows for establishing a lucrative alternative pathway for digital content receipt and delivery to networked consumers. Recognizing the proliferation of digital set-top boxes like element from the leading consumer technology innovators, inclusion of the smart grid network chip set within these devices provides an alternative capability for digital content beyond that currently offered by cellular and broadband suppliers. The digital content may include movies, songs, photographs, advertising media, social media exchanges, internet searching requests, internet searching downloads, digital imagery, web page renderings, streaming media, on-line gaming, voice over internet, video over internet, email communications, business analytics, consumer analytics, industrial automation including SCADA activities, home automation, governmental and emergency related broadcasts, digital business model facilitation, including on-line commerce.

Figure 2:
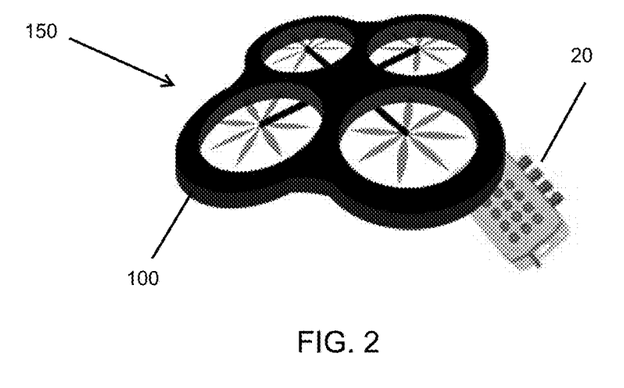
FIG. 2 is a diagram of an apparatus in accordance with an embodiment of the present invention, including a transformer monitoring device installed on an unmanned aerial vehicle.

In accordance with the present invention, an apparatus 150 is provided, as shown in FIG. 2, which combines a transformer monitoring device 20 with a UAV 100. With the apparatus 150, a transformer monitoring device 20 can be deployed to a specific location in a smart grid network 10. The apparatus 150 can supply a replacement transformer monitoring device 20, in the event that one or more pole-mounted transformer monitoring devices 20 are disabled, such as during a disaster or if a utility pole is knocked down. The apparatus 150 may also be deployed and utilized on a temporary basis, in the event that a pole-mounted transformer device 20 is malfunctioning or temporarily non-operational, in order to avoid an extended loss in the functionality of the mesh network 40.

The UAV 100 of the apparatus 150 may take the form of any UAV known in the art, including but not limited to, fixed wing, rotorcraft, lighter than air, magnetic levitation and other categories and may incorporate propellers, rotating elements, jets, lighter than air gases, physically induced mechanisms, and other means for both dynamic and static flight.

The apparatus 150 comprises a signal processor and a memory. The apparatus 150 is configured to be controlled manually by a user at a remote location. The signal processor of the apparatus 150 may be configured to receive commands from a user device at a remote location, which controls the operation and flight of the apparatus 150. The apparatus 150 may further comprise a front-facing camera to capture video during flight for transmission back to the user device, in order to provide the user with a view of the surroundings of the apparatus 150 during flight.

The apparatus 150 also comprises a global positioning system and is configured for automatic flight to a particular location. The apparatus 150 is configured to receive instructions to travel to a particular location, which are implemented by the signal processor for repositioning the apparatus 150 to the requested location. Additionally, the memory of the apparatus 150 may store the locations of other transformer monitoring devices 20 in a smart grid network 10, and the locations of other network devices such as meters 18, and may be instructed to deploy itself to a particular location. As a result, if it is determined that a particular transformer monitoring device 20 has become disabled or is malfunctioning, an apparatus 150 can be deployed to the particular location of the disable transformer monitoring device 20.

In a preferred embodiment, the apparatus 150 is configured for flight at a height of eight meters, or the height of a standard utility pole.

Figure 3A:
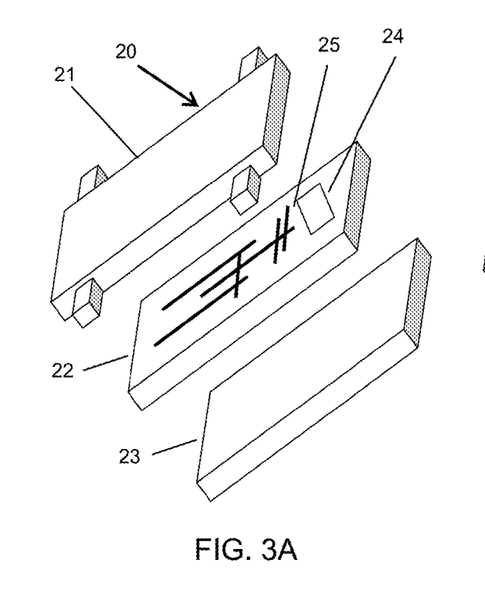
FIG. 3A is a diagram of a transformer monitoring device in accordance with a first embodiment of the present invention.
Figure 3B:
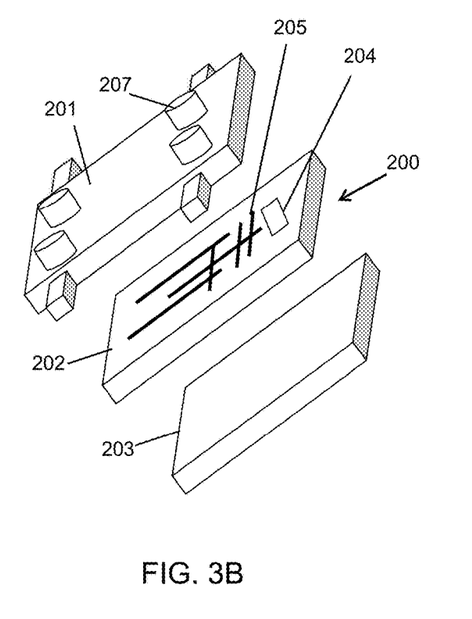
FIG. 3B is a diagram of a transformer monitoring device in accordance with a second embodiment of the present invention.

In the apparatus 150, the transformer monitoring device 20 may be affixed to the UAV 100, as described in reference to FIGS. 3A-3B. This would allow for the removal and attachment of a transformer monitoring device 20 to the UAV 100. Alternatively, the transformer monitoring device 20 may be built into the UAV 100, such that the apparatus 150 is an integral unit comprising the UAV 100 and the components of the transformer monitoring device 20, including a receiver, transmitter, signal processor and memory.

FIG. 3A shows an example embodiment of a transformer monitor/data collection device 20, having, for example, an upper housing 21, internal circuitry 22 and a lower housing base 23.

By way of example, the internal circuitry 22 may be configured inclusive of transmission, reception, networking, data aggregation and sensor input, among other requirements for implementing signal processing functionality in relation to the same. For example, any signal processing functionality may be implemented using a signal processor like element 24, consistent with that set forth herein and described in further detail below.

In particular, the internal circuitry 22 may be configured to implement transmission/reception signal processing functionality, e.g., for exchanging suitable transmission/reception signaling to/from other communication nodes in the smart grid network, or to/from the central location or other connection device like element 50 for further processing, including in relation to some combination of either a cloud network, or a digital data and delivery and receipt mesh network 40, or by using a smart node power grid communication protocol, consistent with that set forth herein.

Further, the internal circuitry 22 may also be configured to implement networking and data aggregation signal processing functionality, e.g., for exchanging suitable networking and data aggregation signaling received to/from other communication nodes in the smart grid network, or to/from the central location or other connection device for further processing, including in relation to some combination of either the cloud network, or the digital data and delivery and receipt mesh network, or by using the smart node power grid communication protocol.

Furthermore, the internal circuitry 22 may also be configured to implement sensor input signal processing functionality, e.g., for exchanging suitable sensor input signaling containing information about sensed input information received by the transformer monitor/data collection device 20 to/from the electric meter 18, 28 of the residential home or commercial building, or to/from the transformer itself. Furthermore still, the scope of the invention is not intended to be limited to any particular type or kind of signal processing functionality that may be implemented by the internal circuitry 22; embodiments are envisioned, and the scope of the invention is intended to include, implementing other types or kind of signal processing functionality by the internal circuitry 22 either now known or later developed in the future within the spirit of the present invention.

The upper housing 21 or housing base 23 may be attached to the UAV 100, by being configured for magnetic attachment, a strap, bolt attachment, or other methodologies. The scope of the invention is not intended to be limited to the type or kind of attachment; and embodiments are envisioned using, and the scope of the invention is intended to include, other types or kinds of attachment techniques either now known or later developed in the future within the spirit of the present invention.

The upper housing 21 and the lower housing base 23 may be combined together to form an assembled housing having the internal circuitry 22 therein. By way of example, the assembled housing may be hermetically sealed against the ingress of environmental elements, e.g., like water, dust, particles, moisture, etc. All interconnect ports may be sealed. The assembled housing may be configured to provide protection for reducing electromagnetic interference (EMI), e.g., from the transformer itself or other EMI emitting devices within range. The assembled housing may also be configured for easy transport, attachment, detachment and decommissioning, e.g., in relation to a utility pole or some other structure.

The transformer monitor/data collection device 20 may include an antenna/optical network 25 built into the internal circuitry 22, or alternatively incorporated directly into either housing 21 or 23, or alternatively located external to the housing assembly. Techniques for implementing a built-in antenna/optical network like element 25 into internal circuitry like element 22, for incorporating an antenna/optical network directly into a housing like elements 21 or 23, or for locating an external antenna/optical network to a housing assembly are known in the art, and the scope of the invention is not intended to be limited to any particular type or kind thereof either now known or later developed in the future.

In the transformer monitor/data collection device 20, a battery may be provided for device power. Alternatively, the transformer monitor/data collection device 20 may also have an accommodation for wireless power transfer via inductance or tuned magnetic resonance. These data and power functionalities are provided by way of example; and the scope of the invention is not intended to be limited to the type or kind of data or power functionality implementation; and embodiments are envisioned using, and the scope of the invention is intended to include, other types or kinds of data or power functionality implementation either now known or later developed in the future within the spirit of the present invention.

The transformer monitor device 20 may further comprise a memory or non-transitory computer readable medium. The memory may be configured to store information that is received or transmitted by the transformer monitor device 20. Further, the memory may be stored with appropriate programming, which when executed by the signal processor 24 of the transformer monitor device 20, is configured to enable the transformer monitor device 20 to transmit and receive signaling, as would be understood by persons having ordinary skill in the art.

FIG. 3B shows a further embodiment of a transformer monitor/data collection device 200, having an upper housing 201, internal circuitry 202 and a lower housing base 203, which may form part of the apparatus 150.

The device 200 is configured for light-based communications, including but not limited to visible light, infrared light, laser technology, LED technology and various light-based communications schemes such as VLC or Li-Fi. Light controlling optics 205 may be built into the internal circuitry 202, incorporated directly into the upper housing 201 or housing base 203, or may be located externally to the housing. The device 200 may comprise one or more external light receptors and transmitters 207, which are configured to receive and transmit optical signals. The transmitter 207 may include, for example a beam generator, which is configured to generate a light beam comprising signaling containing information, which is for example transmitted from a device 200 to a further device 200, which receives the signal via receptor 207 and processes the signal using the signal processor 204.

The use of light-based communication from the transformer monitor device 200 provides for a communication means that has a higher throughput and range than other communications methods, such as cellular. For example, the range of light-based communications with the device 200 may be five times greater, or more, than cellular-based devices, depending upon the optical networking technology utilized. Furthermore, whereas throughput with a Wi-Fi-based device could exceed 54 Mbps, the light-based communications of the device 200 enables a throughput of over 1.2 Gbps, depending upon the optical networking technology utilized.

The device 200 may be configured to use one or more light-based communication technologies, and may be configured to vary between types of communication depending on the particular usage. For example, for a long range communication between two devices 200, laser technology may be most suitable. However, for a short range communication between two devices 200, Li-Fi may be the most suitable method of communication.

The transformer monitor device 200 may further comprise a memory or non-transitory computer readable medium. The memory may be configured to store information that is received or transmitted by the light-based communication of the transformer monitor device. Further, the memory may be stored with appropriate programming, which when executed by the signal processor 204 of the transformer monitor device, is configured to enable the transformer monitor device to transmit and receive light-based communications, as would be understood by persons having ordinary skill in the art.

The transformer monitor device 200 may enable the establishment of a hybrid network within the smart grid network 10, which may include at least three different types of communication capabilities. First, the devices 200 may be configured to create an optical network, as previously described. In an optical network, devices 200, as well as other devices in a smart grid network 10, such as electric meters 18 and IoT devices, having optical transmission and receiving capabilities may communicate with one another. Such an optical network allows for communication of signals and data at a high bandwidth and range. Additionally, the device 200 may be further configured for cellular communication. The device 200 is configured to send and receive signaling to and from a cellular tower and from cellular devices in the smart grid network 10. Furthermore, the device 200 may be configured to create a wireless or Wi-Fi network, which can be used for communication with or between electric meters 18 and IoT devices, which in certain instances may not be configured for optical or light-based communication. The creation of a Wi-Fi network by the device 200 or a series of devices 200 enables communication between such legacy devices.

Figure 4:
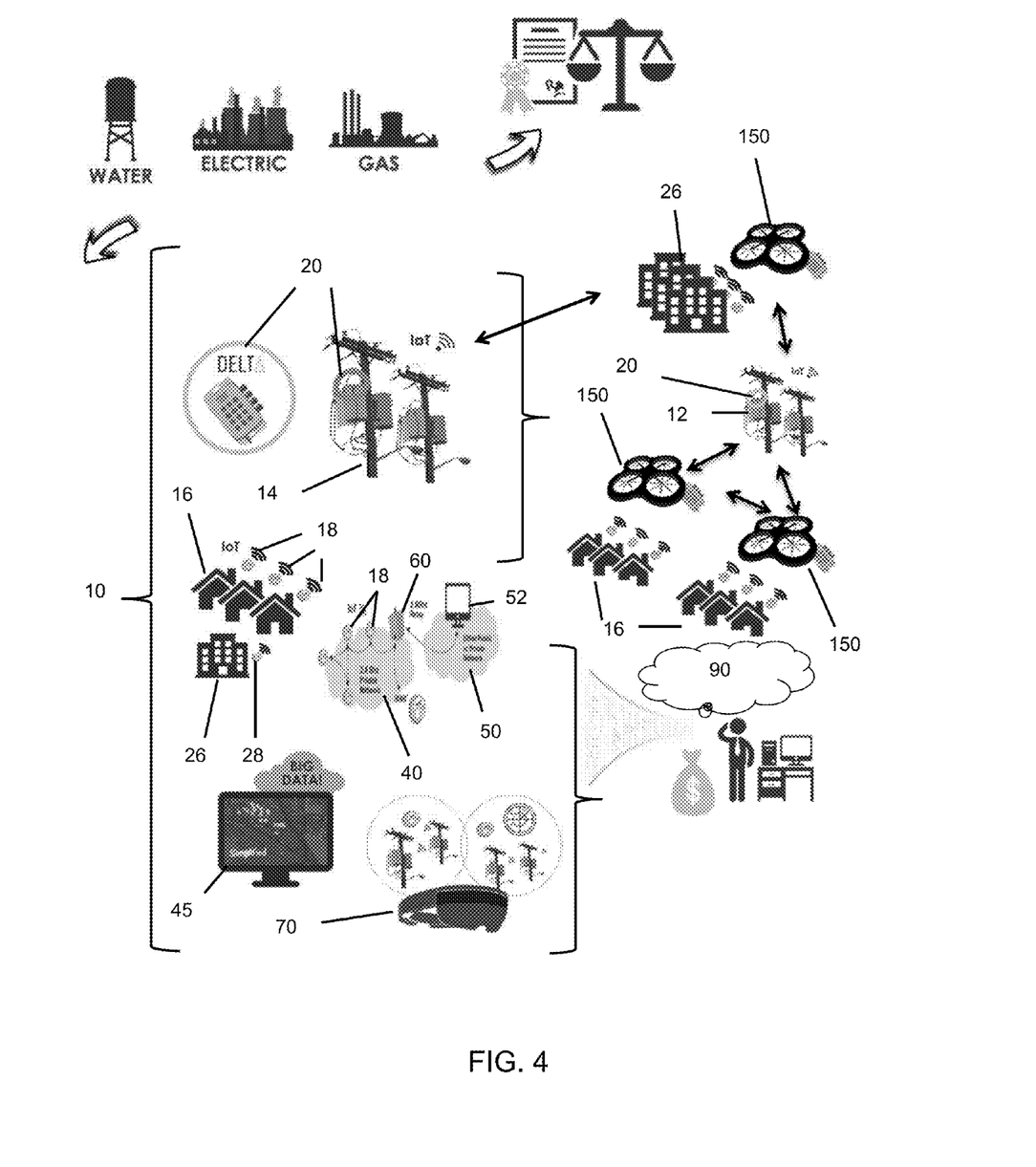
FIG. 4 is a diagram of an augmentation of the baseline, power grid centric, smart utility mesh network, using an apparatus in accordance with an embodiment of the present invention.

FIG. 4 illustrates an augmentation of a smart utility mesh network, using an apparatus 150 in accordance with an embodiment of the present invention.

As displayed in FIG. 4, one or more apparatus 150 can be deployed to create either a static or immediately re-configurable augmented network, which may serve as an augmentation to allow for mesh network servicing, relocation, optimization, security enhancement, and urban resilience testing or disaster relief activities.

One or more apparatuses 150 can be deployed in an existing smart grid mesh network 40, which may be enabled by a pole-mounted transformer monitor device 20 and include one or more buildings 16, 26 having electric meters 18, 28, as well as other IoT or user devices in the smart grid network 10 that access the mesh network 40. The one or more apparatuses 150 may augment such an existing mesh network 40 by supplying additional transformer monitoring devices 20, which may serve as further relay points in the mesh network for the exchanging of data and content between network devices. In addition to electric meters 18, 28, network devices in the mesh network may include mobile communications devices, personal computers, smart phone, a smart tablet, a laptop computer, a desktop computer, a person digital assistant (PDA) device, a smart wearable device, digital set-top boxes and other IoT-enabled consumer devices.

Figure 5:
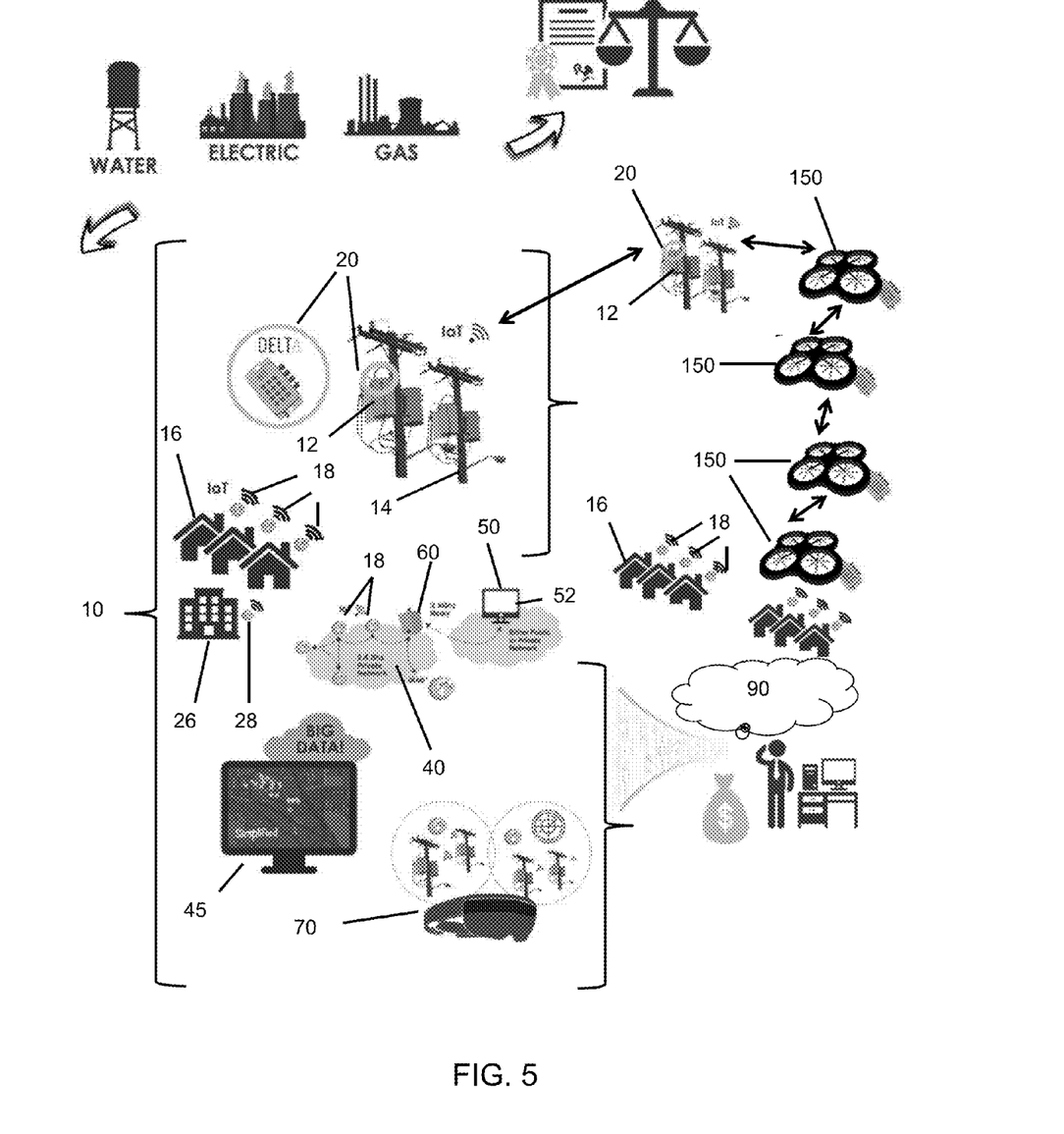
FIG. 5 is a diagram of an extension of the baseline, power grid centric, smart utility mesh network, using an apparatus in accordance with an embodiment of the present invention.

FIG. 5 illustrates an extension of a smart utility mesh network, using an apparatus 150 in accordance with an embodiment of the present invention.

Similar to the concepts noted above for augmentation, incorporation of the mesh network within deployed apparatuses 150 provides an economical alternative to fixed infrastructure with regards to mesh network 40 extension. This capability allows for immediate mesh network deployment, routing investigation, review and, ultimately, optimized fixed deployment.

One or more apparatuses 150 can be deployed in an existing smart grid mesh network 40 to extend the range of the mesh network 40. A mesh network 40 may require an extension if, for example, there is an additional structure 16 with electric meters 18 and other IoT or user devices that wish to join a mesh network 40, but are geographically at a distance that is outside the range for optimal transmission to or from an existing transformer monitoring device 20 or other network devices that can serve as a relay to the devices of the structure 16. The one or more apparatuses 150 may be deployed outside the existing geographic range of the smart grid mesh network 40 to extend the range of the mesh network 40, by supplying additional transformer monitoring devices 20, which may serve as further relay points in the mesh network 40 for the exchanging of data and content between network devices.

Figure 6:
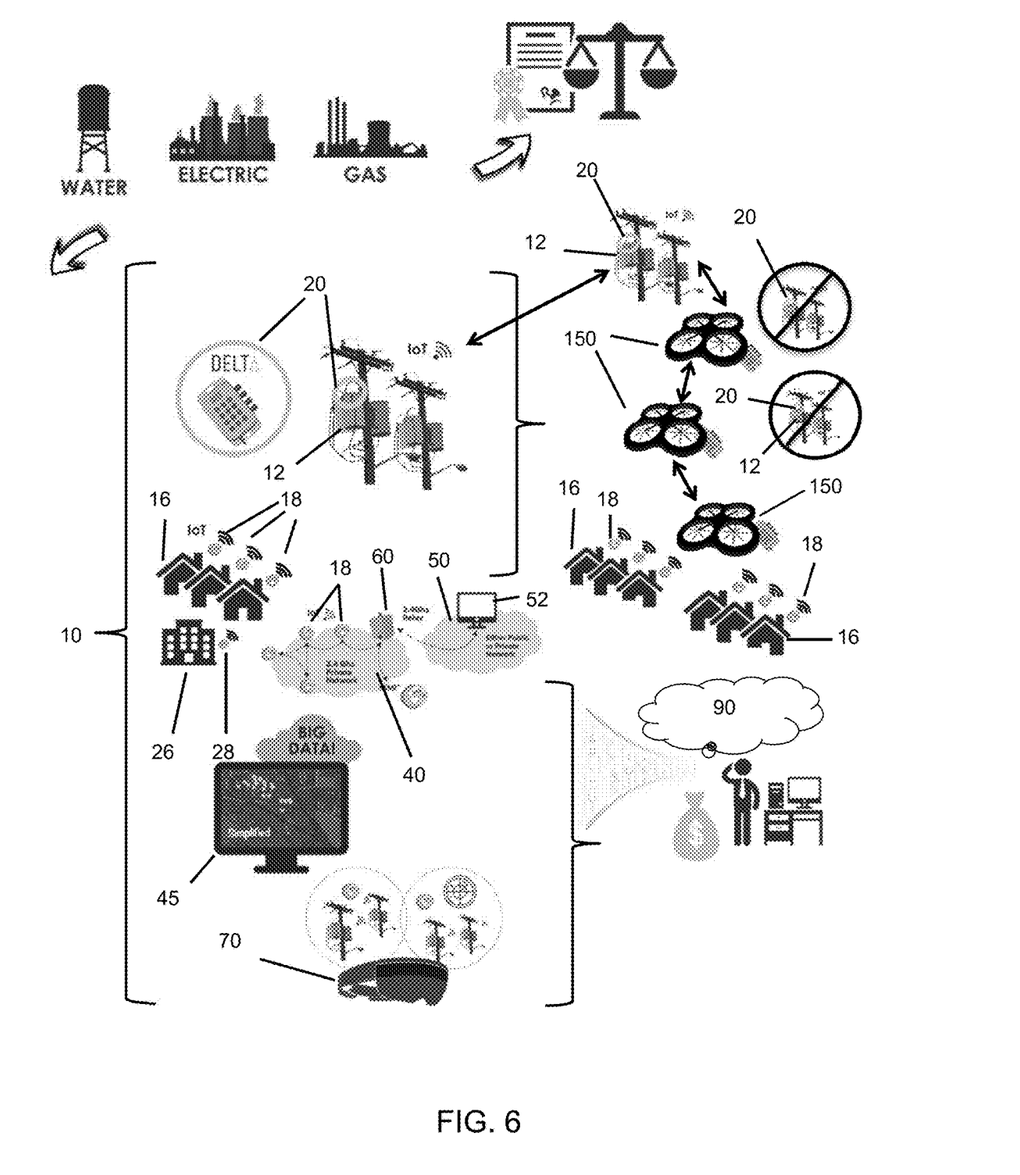
FIG. 6 is a diagram of self-healing of the baseline, power grid centric, smart utility mesh network, using an apparatus in accordance with an embodiment of the present invention.

FIG. 6 illustrates self-healing of a smart utility mesh network 40, using an apparatus 150 in accordance with an embodiment of the present invention.

As previously described, providing a unique capability for urban resilience and disaster relief, the apparatus 150 allows for an immediate self-healing capability to non-optimal or damaged mesh networks 40. This capability allows for the immediate disbursement of apparatuses 150 to specific mesh nodes to affect mesh communications optimization or healing, in the case of catastrophic natural or man-made events. Apparatuses 150 can remain active during network field operations, such as maintenance or repair of pole-mounted transformer monitoring devices 20, ensuring the ongoing capability of the deployed smart grid mesh network 40.

Because the geographic locations of assets in a smart grid network 10 are known, the apparatus 150 can be used to supplementing assets which have already been GPS tagged and at which some type of operational incident has occurred. Deployed apparatuses 150 may be centrally controlled via human operators and/or may be programmed and autonomous in their operation, comprising a memory stored with locations pre-programmed and specific software regarding unmanned flight operation, which are understood in the art. In either case, the apparatus 150 returns to a central location of deployment at the end of a prescribed mission. While in field, the apparatus 150 facilitates smart grid mesh communications activity.

Within the smart grid network 10, it can be determined where both electrical issues and network issues are occurring. Consequently, the apparatuses 150 can be deployed upon these identified issues. The mesh network 40 enabled or repaired by the apparatus 150 is not an ad-hoc network, but rather, it is purposeful and geo-spatially fixed. Additionally, the apparatus 150 can supplement the mesh network 40 not only to provide communications to non-descript digital devices in the mesh network 40, but also to facilitate data necessary for the continuity in electrical utility efficient operations.

Other Related Applications

The application is related to other patent applications, some of which are identified above, that together form part of the overall family of technologies developed by one or more of the inventors herein, and disclosed in the following applications:

U.S. patent application Ser. No. 15/160,754, filed 20 May 2016, entitled "Transformer mounted monitor, communications and data collection device," which claims benefit to U.S. provisional application No. 62/203,101, filed 10 Aug. 2015;

U.S. patent application Ser. No. 15/234,293, filed 11 Aug. 2016, entitled "Enhanced reality system for visualizing, evaluating, diagnosing, optimizing and servicing smart grids and incorporated components," which claims benefit to U.S. provisional application Ser. No. 62/203,719, filed 11 Aug. 2015;

U.S. provisional application Ser. No. 62/375,170, filed 15 Aug. 2016, entitled "Integrated solution of Internet of Things, DSGN™, and iDAP™ pertaining to Communication, Data and Asset Serialization";

U.S. application Ser. No. 15/257,302 filed 6 Sep. 2016, entitled "System and Method for Determination and Remediation of Energy Diversion in a Smart Grid Network", which claims the benefit of U.S. provisional application Ser. No. 62/213,815, filed 3 Sep. 2015;

U.S. application Ser. No. 15/250,119 filed 29 Aug. 2016, entitled "Supplemental And Alternative Digital Data Delivery and Receipt Mesh Network Realized Through the Placement of Enhanced Transformer Mounted Monitoring Devices", which claims the benefit of U.S. provisional application Ser. No. 62/236,420 filed 2 Oct. 2015;

U.S. provisional application Ser. No. 62/244,919, filed 22 Oct. 2015, entitled "Data Transfer Facilitation Across a Distributed Mesh Network Using Light and Optical Based Technology;" and U.S. provisional application Ser. No. 62/299,348, filed 24 Feb. 2016, entitled "Distributed 802.11s mesh network using HYPERSPROUT hardware for the capture and transmission of data;"

which are all assigned to the assignee of the instant patent application, and which are all incorporated by reference in their entirety.

It should be understood that, unless stated otherwise herein, any of the features, characteristics, alternatives or modifications described regarding a particular embodiment herein may also be applied, used, or incorporated with any other embodiment described herein. Also, the drawing herein may not be drawn to scale in whole or in part. Although the invention has been described and illustrated with respect to exemplary embodiments thereof, the foregoing and various other additions and omissions may be made therein and thereto without departing from the spirit and scope of the present invention.

What we claim is:

1. An apparatus comprising:
an unmanned aerial vehicle; and
a transformer monitoring device comprising a signal processor configured to:
  receive signaling containing data from one or more network devices in a smart grid network;
  transmit signaling containing data to the one or more network devices in the smart grid network; and
  receive further signaling containing metered usage data from at least one electric meter associated with a building receiving electricity from a transformer in the smart grid network;
wherein the transformer monitoring device is configured to enable a mesh network in the smart grid network to exchange data and content between network devices;
wherein the unmanned aerial vehicle comprises a signal processor and a memory, and the memory is stored with data relating to geographic locations of the one or more network devices in the smart grid network;
wherein the signal processor of the unmanned aerial vehicle and/or the signal processor of the transformer monitoring device is configured to determine geographic positioning of the apparatus;
wherein the signal processor of the unmanned aerial vehicle is configured to receive signaling from a user device instructing the apparatus to deploy to a stored geographic location of a disabled or malfunctioning network device in the smart grid network; and
wherein the apparatus is configured to repair the mesh network of the smart grid network by replacing the disabled or malfunctioning network device at the stored geographic location and serving as a communications relay in the mesh network in place of the disabled or malfunctioning network device at the stored geographic location.

2. The apparatus according to claim 1, wherein the smart grid network further comprises a cloud-based server; and
wherein the transformer monitoring device is configured to serve as a relay for data transmitted between the cloud-based server and one or more network devices, or between two or more network devices.

3. The apparatus according to claim 2, wherein the one or more network devices in the smart grid network comprise a second apparatus comprising a second unmanned aerial vehicle and a second transformer monitoring device; and
wherein the transformer monitoring device is configured to serve as a relay for data transmitted to or from the second apparatus in the smart grid network.

4. The apparatus according to claim 2, wherein the one or more network devices in the smart grid network comprise a second transformer monitoring device in the smart grid network mounted to a utility pole; and
wherein the transformer monitoring device is configured to serve as a relay for data transmitted to or from the second transformer monitoring device.

5. The apparatus according to claim 2, wherein the one or more network devices comprise one or more of a mobile communications device, a personal computer or a digital set-top box; and
wherein the transformer monitoring device is configured to receive signaling containing a request for digital content from the one or more network devices, transmit signaling containing the request for digital content to the cloud-based server, receive signaling containing the requested digital content from the cloud-based server, and transmit signaling containing the requested digital content to the one or more network devices.

6. The apparatus according to claim 1, wherein the signal processor of the unmanned aerial vehicle is configured to receive signaling from the user device comprising instructions for manually operating flight of the unmanned aerial vehicle to a location in the smart grid network by the user device.

7. The apparatus according to claim 2, wherein the signal processor of the transformer monitoring device is configured to receive further signaling containing metered usage data from a plurality of electric meters, each associated with one of a plurality of buildings receiving electricity from the transformer in the smart grid network, and
wherein the signal processor of the transformer monitoring device is configured to transmit signaling containing data relating to the metered usage data from the plurality of electric meters to the cloud-based server.

8. The apparatus of claim 1, wherein the received and transmitted signaling containing data and the signaling containing metered usage data are optical signals.

9. The apparatus of claim 1, wherein the transformer monitoring device signal processor is further configured to receive further signaling containing data from a smart infrastructure device in the smart grid network, including one or more of a street light, road sign, traffic light or asset tracking module.

10. A smart grid network comprising:
a first transformer monitoring device affixed to a utility pole or transformer at a first location;
one or more network devices, including at least one electric meter associated with a building receiving electricity from a transformer in the smart grid network;
a first apparatus comprising:
an unmanned aerial vehicle; and
a second transformer monitoring device comprising a signal processor configured to:
receive signaling containing data from the one or more network devices in the smart grid network;
transmit signaling containing data to the one or more network devices in the smart grid network; and
receive further signaling containing metered usage data from the at least one electric meter associated with the building receiving electricity from the transformer in the smart grid network; and
a mesh network enabled by the second transformer monitoring device and configured to exchange data and content between the one or more network devices;
wherein the unmanned aerial vehicle comprises a signal processor and a memory, and the memory is stored with data relating to geographic locations of the one or more network devices in the smart grid network;
wherein the signal processor of the unmanned aerial vehicle and/or the signal processor of the second transformer monitoring device is configured to determine geographic positioning of the apparatus;
wherein the signal processor of the unmanned aerial vehicle is configured to receive signaling from a user device instructing the first apparatus to deploy to a stored geographic location of a disabled or malfunctioning network device in the smart grid network; and
wherein the first apparatus is configured to repair the mesh network of the smart grid network by replacing the disabled or malfunctioning network device at the stored geographic location and serving as a communications relay in the mesh network in place of the disabled or malfunctioning network device at the stored geographic location.

11. The smart grid network according to claim 10, further comprising a cloud-based server, wherein the second transformer monitoring device is configured to serve as a relay for data transmitted between the cloud-based server and one or more network devices, or between two or more network devices.

12. The smart grid network according to claim 10, wherein the second transformer monitoring device is configured to serve as a relay for data transmitted to or from the first transformer monitoring device.

13. The smart grid network according to claim 10, further comprising a second apparatus comprising a second unmanned aerial vehicle and a third transformer monitoring device; and
wherein the second transformer monitoring device is configured to serve as a relay for data transmitted to or from the second apparatus in the smart grid network.

14. The smart grid network of claim 10, wherein the first apparatus is positioned at a second location different from the first location, and is configured to extend a geographic range of the mesh network.

15. The apparatus of claim 1, wherein the transformer monitoring device is built into or affixed to the unmanned aerial vehicle.

* * * * *